D. BLY.
Thill-Coupling.
No. 253. A. I. Patented Oct. 11, 1859.
Fig. 1.
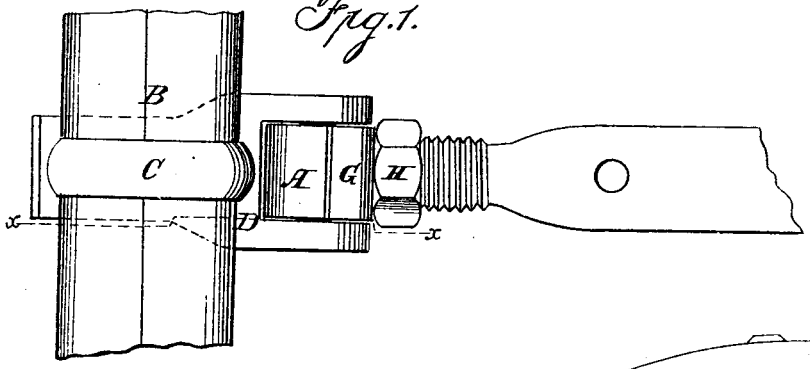
Fig. 2.
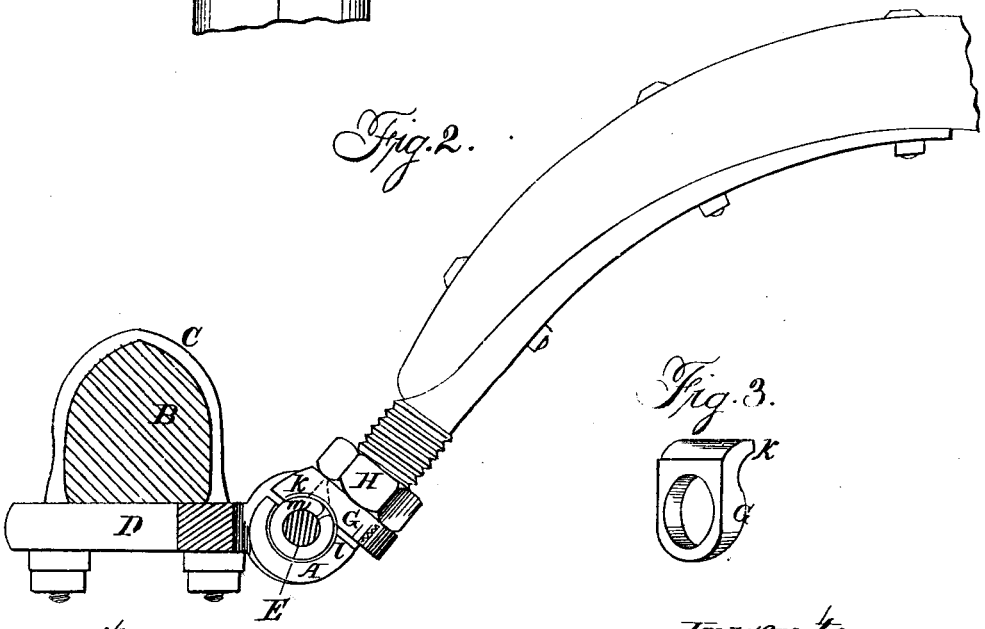
Fig. 3.
Witnesses.
J. Fraser
S. Ellis
Inventor.
Douglas Bly
N. PETERS, PHOTO-LITHOGRAPHER, WASHINGTON, D. C.

DEPARTMENT OF COMMERCE
UNITED STATES PATENT AND TRADEMARK OFFICE

---

MISSING PAGE(S)

PATENT NUMBER AI 253 FOR THE ISSUE DATE 10/11/1859 HAS BEEN SCANNED/LOADED, BUT WITH MISSING PAGES(S). UPON RECEIPT OF THE MISSING PAGE(S), THE ENTIRE DOCUMENT WILL BE RESCANNED.

THIS NOTICE IS FOR THE MISSING PAGE(S) CONTAINING:

All Text / Claims